(12) United States Patent
Gorelik et al.

(10) Patent No.: US 10,504,175 B2
(45) Date of Patent: Dec. 10, 2019

(54) METHOD, SYSTEM AND MACHINE READABLE PROGRAM FOR MITIGATING EFFECTS OF SPIKES IN FINANCIAL DATA

(75) Inventors: Victor Gorelik, Brooklyn, NY (US); Philip C. Doyle, Commack, NY (US)

(73) Assignee: Refinitiv US Organization LLC, New York, NY (US)

( * ) Notice: Subject to any disclaimer, the term of this patent is extended or adjusted under 35 U.S.C. 154(b) by 1416 days.

(21) Appl. No.: 11/937,737

(22) Filed: Nov. 9, 2007

(65) Prior Publication Data

US 2009/0125447 A1    May 14, 2009

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ........ G06Q 40/00; G06Q 40/02; G06Q 40/04; G06Q 40/06; G06Q 40/08; G06Q 40/025; G06Q 20/10; G06Q 30/08
USPC ................................. 705/35, 36 R, 36 T, 37
See application file for complete search history.

(56) References Cited

U.S. PATENT DOCUMENTS

| | | | |
|---|---|---|---|
| 4,412,287 A | 10/1983 | Braddock, III | |
| 4,965,800 A | 10/1990 | Farnbach | |
| 6,745,150 B1 * | 6/2004 | Breiman | 702/181 |
| 7,072,863 B1 * | 7/2006 | Phillips et al. | 705/36 R |
| 7,157,924 B2 | 1/2007 | Muhtaroglu et al. | |
| 7,239,494 B2 | 7/2007 | Naffziger | |
| 7,542,939 B2 * | 6/2009 | Ferguson et al. | 705/37 |
| 7,653,449 B2 * | 1/2010 | Hunter et al. | 700/99 |
| 7,685,041 B1 * | 3/2010 | Yao et al. | 705/35 |
| 7,869,967 B2 * | 1/2011 | Marvasti et al. | 702/83 |
| 2003/0120535 A1 | 6/2003 | Duka | |
| 2004/0267654 A1 * | 12/2004 | Peng et al. | 705/37 |

(Continued)

FOREIGN PATENT DOCUMENTS

WO    WO 01/73589    10/2001

OTHER PUBLICATIONS

International Search Report and the Written Opinion of the International Searching Authority dated Jun. 24, 2009 for PCT/US2008/012653.

(Continued)

*Primary Examiner* — Gregory A Pollock
(74) *Attorney, Agent, or Firm* — Norton Rose Fulbright US LLP

(57) ABSTRACT

A method for analyzing financial data generated in an exchange in communication with a client/server network. The method includes the steps of receiving a first set of data related to a financial instrument on the exchange, the first set of data being within a time interval and including: a high value for the financial instrument during the time interval; a low value for the financial instrument during the time interval; an opening value for the financial instrument during the time interval; and a closing value for the financial instrument during the time interval. The method also detects a spike in the time interval using a confidence value based upon the first set of data and displays a graph of a set of transactions of the financial instrument, the graph being scaled to prevent the spike from substantially affecting visual information relating to the set of transactions.

21 Claims, 12 Drawing Sheets

(56) References Cited

U.S. PATENT DOCUMENTS

2006/0167369 A1  7/2006  Montgomery, Jr. et al.
2006/0195383 A1  8/2006  Masuda

OTHER PUBLICATIONS

European Search Report issued in Application No. PCT/US2008012653, dated Jun. 28, 2012.

* cited by examiner

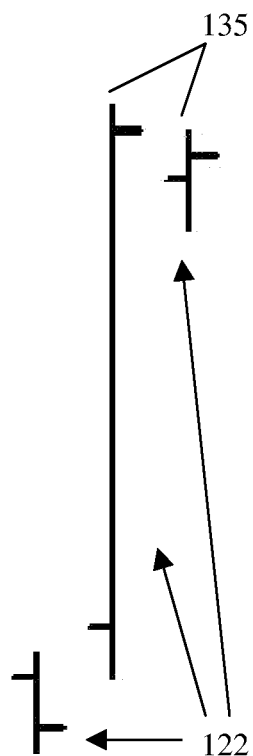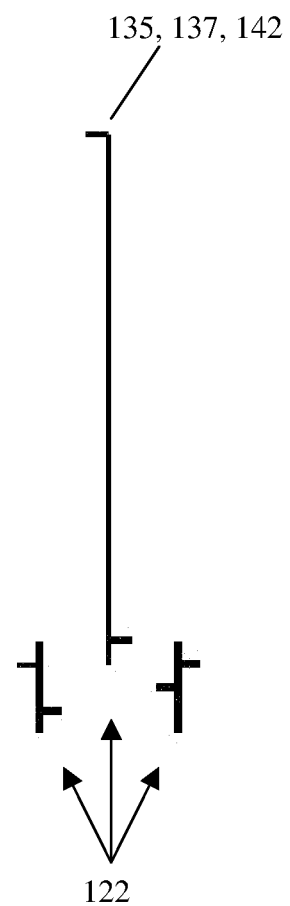
Fig. 3(A)                    Fig. 3(B)

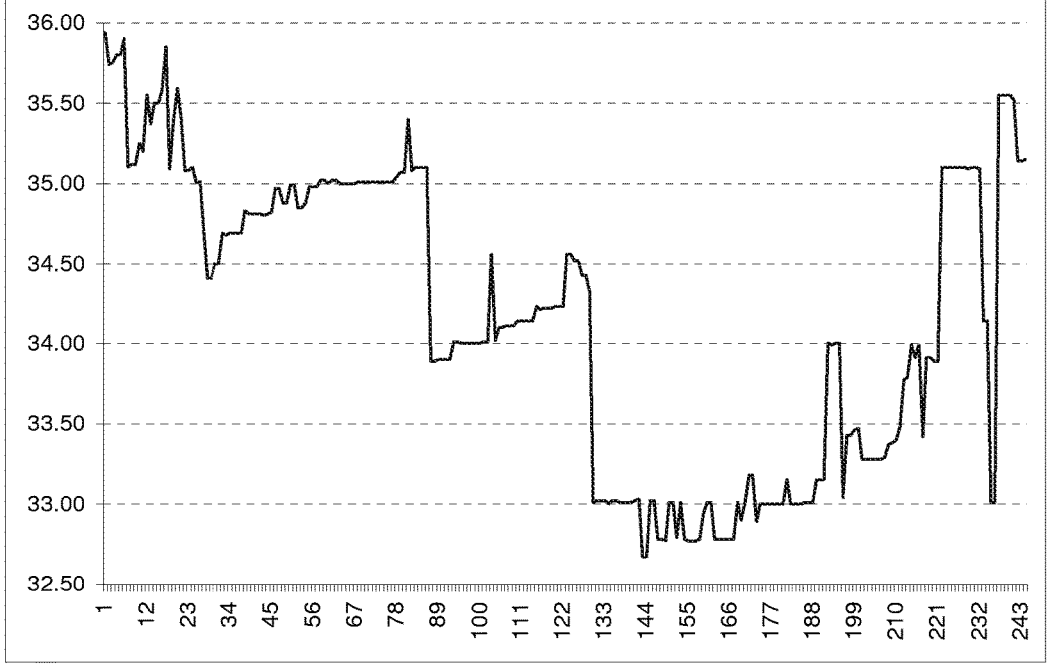

METHOD, SYSTEM AND MACHINE READABLE PROGRAM FOR MITIGATING EFFECTS OF SPIKES IN FINANCIAL DATA

COPYRIGHT NOTICE

A portion of the disclosure of this patent document contains material that is subject to copyright protection. The copyright owner has no objection to the reproduction by anyone of the patent document or patent disclosure as it appears in the Patent and Trademark Office, patent file or records, but otherwise reserves all copyrights whatsoever.

BACKGROUND OF THE INVENTION

Field of the Invention

The present invention relates to techniques for removing anomalies such as spikes from data. Particularly, the present invention is directed to systems, methods and software programs for removal of anomalies from financial data.

Description of Related Art

Price spikes have become an increasingly common and annoying problem for chartists, particularly those that regularly view intra day financial charts. When a spike comes through, for example, on either a high or a low value, it causes the chart to rescale. Depending on the size of the spike, it can render the chart useless from a practical standpoint.

A variety of approaches have been proposed for mitigating spikes in various contexts. For example, U.S. Pat. No. 4,965,800 discloses a digital signal fault detector using low and high voltage thresholds for spike discriminator. U.S. Pat. No. 4,412,287 discloses a similar approach for removing spikes from price data if new market price exceeds the fluctuation limits allowed by the market regulator. Additional techniques of spike removal in technical systems may be accomplished, for example, by delaying of the input signal as described in U.S. Pat. No. 7,239,494 or by generating an additional reference signal by connecting to different parts of the source object as described in U.S. Pat. No. 7,157,924.

However, these approaches are not satisfactory. For example, earlier approaches to spike removal based on comparison with threshold limits of the signal itself such as in U.S. Pat. No. 4,965,800 and in U.S. Pat. No. 4,412,287 are generally only appropriate for working with narrow range signals. Signals of high dynamic range might be discriminated incorrectly and spikes might not be detected. Moreover, approaches based on comparison with reference signals, such as those in U.S. Pat. Nos. 7,239,494 or 7,157,924 are not useful for price time series.

Furthermore, additional problems with spikes in price data are related to the periods when market is closed (e.g. during the night). During these periods of time important economic events may happen causing significant changes in price, which could be mistakenly identified as spikes by known methods.

Still another problem in spike removal from price data is the fact that price behavior is better described by jump-diffusion models (see for example S. G. Kou, "A Jump-Diffusion Model for Option Pricing", Management Science, Vol. 48, No. 8, August 2002), not by just a diffusion model. The difference between these two models is an additional "jump component" term in the pertinent stochastic differential equation. This "jump component" describes irregular jumps in price, which could be mistakenly identified as spikes by known methods.

Accordingly, there is a continued need in the art for improved techniques for removal of spikes in data. The present invention provides a solution for these problems.

SUMMARY OF THE INVENTION

Advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a method for analyzing financial data. The method includes identifying a financial instrument and a time interval associated therewith. The financial instrument has a first set of data associated therewith, which includes a plurality of values. The values may include a first value associated with a high value for the financial instrument during the time interval and a second value associated with a low value for the financial instrument during the time interval. The values may further include a third value associated with an opening value for the financial instrument during the time interval and a fourth value associated with a closing value for the financial instrument during the time interval. The method further includes analyzing whether the time interval includes a spike based upon the first set of data.

In accordance with a further aspect of the invention, the method may further include determining that the time interval includes the spike, and transmitting a signal representative of a graphical representation of a set of transactions associated with the financial instrument. The graphical representation is preferably adapted and configured to prevent the spike from substantially affecting the scale at which information relating to the set of transactions is displayed.

In accordance with another aspect of the invention, the values associated with a first sub interval within the time interval may be analyzed to determine the presence of a spike therein. Preferably, the first sub interval is analyzed to determine the presence of a spike therein with reference to values associated with a second sub interval within the time interval. A spike may be detected in the first sub interval by comparing a first quantity computed from values associated with the first sub interval with a second quantity computed using values associated with the second sub interval. If desired, the time interval may be determined to include a spike if the magnitude of the first quantity is substantially greater than the magnitude of the second quantity. Moreover, the second sub interval may include a plurality of further sub intervals. In accordance with this embodiment, the second quantity may be computed by averaging a plurality of sub quantities, each sub-quantity being computed from values associated with each sub interval.

In accordance with still another aspect of the invention, the first quantity may be computed by subtracting an opening or closing value associated with the first sub interval from a high or low value associated with the first sub interval.

In accordance with yet another aspect of the invention, the presence of the spike may be determined with reference to three values associated with the first sub interval. For example, the three values may include the opening value, the closing value, and a value selected from the group consisting of (i) the high value, and (ii) the low value.

In accordance with a further aspect of the invention, the closing value associated with a sub interval prior to the first sub interval may be substituted for the opening value associated with the first sub interval to compute the first quantity if the opening value associated with the first sub interval is equal to either of (i) the high value associated with the first sub interval, or (ii) the low value associated with the first sub interval. By way of further example, the opening value associated with a sub interval subsequent to the first sub interval may be substituted for the closing value associated with the first sub interval to compute the first quantity if the closing value associated with the first sub interval is equal to either of (i) the high value associated with the first sub interval, or (ii) the low value associated with the first sub interval.

In accordance with another aspect of the invention, the method may further include displaying a graphical representation of the time interval relating to the financial instrument. If desired, the method may further include applying a graphical indicia to the graphical representation to indicate the location of the spike in the time interval. The value associated with the spike may be deleted. By way of further example, the value associated with the spike may be replaced with the closing value associated with the time interval or the opening value associated with the time interval, as desired.

In accordance with still a further aspect of the invention, a user may be given the choice to control the impact of the spike on the graphical representation. For example, the user may be able to specify an amount by which the first quantity exceeds the second quantity before the presence of a spike is detected in the first sub interval. In accordance with another aspect, the sensitivity of the analysis may be adjusted by a user in a variety of other ways.

In accordance with still another aspect of the invention, a positive and/or negative spike may be detected in the time interval. Moreover, the time interval or any sub interval thereof may actually include a plurality of positive and/or negative spikes. In accordance with one aspect, the first sub interval may occur at substantially the same time as the analysis.

The invention also provides a system for analyzing financial data. The system includes means for identifying a financial instrument and a time interval associated therewith. The financial instrument has a first set of data associated therewith including a plurality of values such as a first value associated with a high value for the financial instrument during the time interval and a second value associated with a low value for the financial instrument during the time interval. The first set of data may also include a third value associated with an opening value for the financial instrument during the time interval and a fourth value associated with a closing value for the financial instrument during the time interval. The system further includes means for analyzing whether the time interval includes a spike based upon the first set of data. In accordance with a further aspect of the invention, the system may be adapted and configured to implement the method steps of the invention described herein as well as other features.

The invention also provides a machine readable program on a computer readable medium containing instructions for controlling a system for analyzing financial data. The program includes a first computer code segment for identifying a financial instrument and a time interval associated therewith. The financial instrument has a first set of data associated therewith including a plurality of values, such as a first value associated with a high value for the financial instrument during the time interval and a second value associated with a low value for the financial instrument during the time interval. The first set of data further may include a third value associated with an opening value for the financial instrument during the time interval and a fourth value associated with a closing value for the financial instrument during the time interval. The program further includes a second computer code segment for analyzing whether the time interval includes a spike based upon the first set of data. In accordance with a further aspect of the invention, the program may be adapted and configured to implement the method steps of the invention described herein as well as other features.

The invention also provides a graphical user interface for controlling a system for analyzing financial data. The graphical user interface includes a first field for identifying a financial instrument and a time interval associated therewith. The financial instrument has a first set of data associated therewith including a plurality of values. The values may include a first value associated with a high value for the financial instrument during the time interval and a second value associated with a low value for the financial instrument during the time interval. The values may further include a third value associated with an opening value for the financial instrument during the time interval and a fourth value associated with a closing value for the financial instrument during the time interval. The graphical user interface further includes a second field for actuating an analysis to determine whether the time interval includes a spike based upon the first set of data. In accordance with a further aspect of the invention, the graphical user interface may be adapted and configured to implement the method steps of the invention described herein as well as other features.

It is to be understood that the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain principles of the invention.

BRIEF DESCRIPTION OF THE DRAWINGS

FIGS. 2(A)-2(B) and 3(A)-3(B) are representative embodiments of time intervals that are analyzed to determine the presence of data anomalies therein in accordance with the present invention.

FIG. 6 is an expanded view of the data spike depicted in FIG. 5(A).

DETAILED DESCRIPTION OF PREFERRED EMBODIMENTS

Reference will now be made in detail to the present preferred embodiments of the invention, examples of which are illustrated in the accompanying drawings. The method and corresponding steps of the invention will be described in conjunction with the detailed description of the system.

The devices and methods presented herein may be used for removing anomalies such as spikes from data. Particularly, the present invention is suitable for removal of anomalies from financial data.

In accordance with the invention, a method is provided. The method includes identifying a financial instrument and a time interval associated therewith. The financial instrument has a first set of data associated therewith, which includes a plurality of values. Values in the time interval are then analyzed to determine the presence of a spike or other anomaly.

Figure 1:
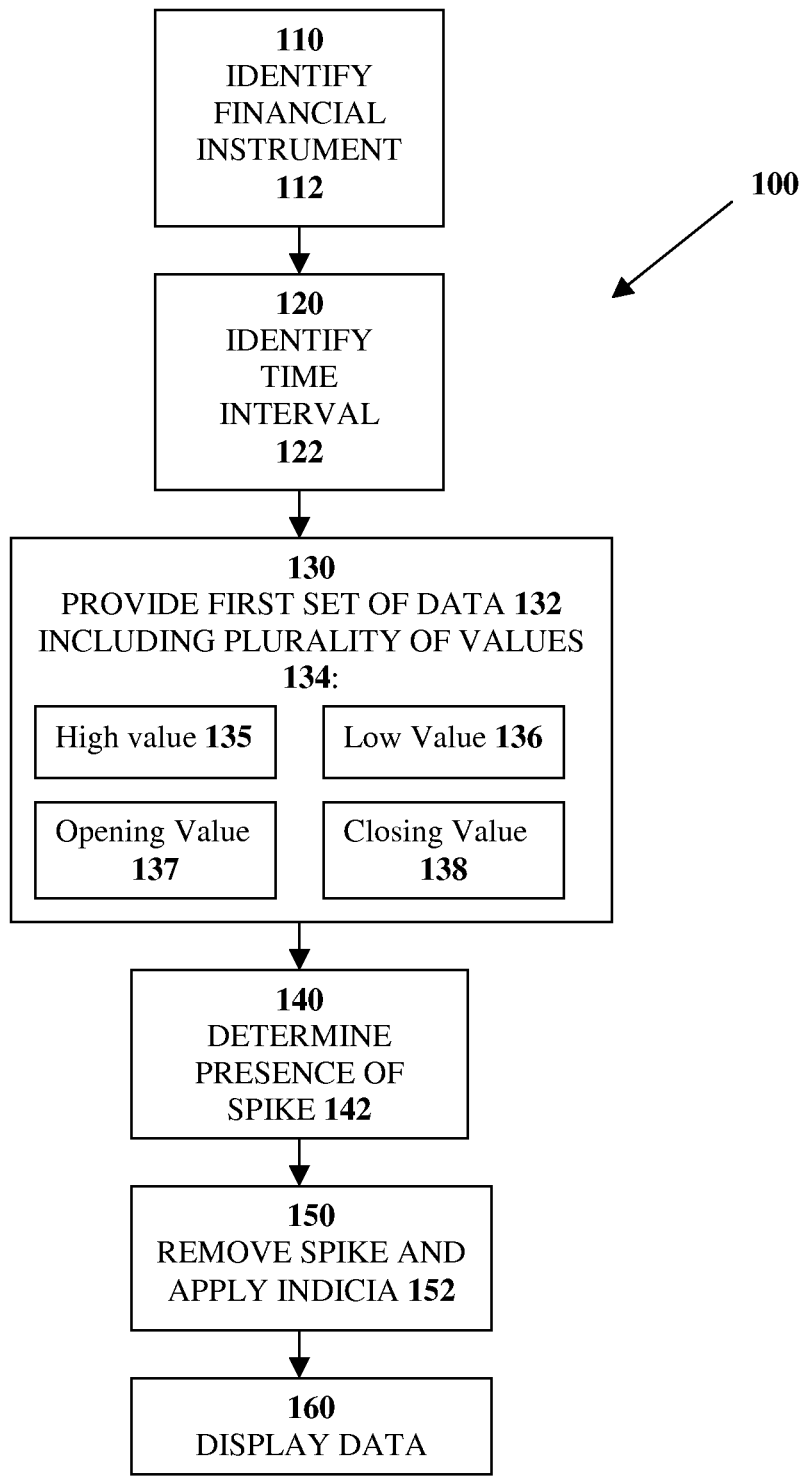
FIG. 1 is a schematic view of a process flow of an exemplary embodiment of a method provided in accordance with the present invention.

For purpose of explanation and illustration, and not limitation, a flow diagram is presented in FIG. 1 illustrating the process flow of an exemplary embodiment 100 of a method in accordance with the invention. Other aspects of exemplary embodiments of methods, systems, software programs or graphical user interfaces provided in accordance with the invention are provided in FIGS. 2-8, as will be described.

As illustrated in FIG. 1, the method preferably begins with identifying a financial instrument 112 in step 110. Financial instrument 112 may be any suitable financial instrument, such as an equity based (e.g., stock, stock fund), debt based (e.g., bond, bond fund), or a foreign exchange instrument, as desired. It will be recognized that these general categories of instruments include myriad subcategories of financial instruments, as known in the art. In accordance with another aspect of the invention, in addition to financial instruments, the methods and systems herein are equally applicable to any other type of data that may include anomalies such as spikes, such as other financial data, scientific data, and the like.

As further illustrated in FIG. 1, the illustrated method 100 further includes selecting a time interval 122 associated with the financial instrument in step 120. Generally speaking, a time interval 122 can be considered to be a definite length of time marked off by two instants. In accordance with such a definition, a time interval 122 may be, for example, as small as a fraction of a second, or as large as several hours or days. For purposes of illustration, anomalies such as spikes 142 in the context of financial data may constitute an isolated, outlying event involving only a single transaction of the financial instrument of interest. Such an anomaly may be captured in a time interval that is significantly shorter than a second. Such spikes generally arise from erroneous trades. On the other hand, as illustrated in further detail in the Example below, anomalies such as spikes may easily include hundreds or thousands of transactions occupying several minutes. Such spikes may not arise from erroneous information, but will still have the net effect of eliminating the resolution in a displayed chart since the magnitude of the spike will be far greater than the range of the fluctuations that would otherwise be readily discernable from the graphical data.

In step 130 a first set of data 132 is provided including a plurality of values 134. In accordance with a preferred embodiment, the values 134 include financial data points relating to the value of a financial instrument 112 at specific points in time within the selected time interval 122. The values 134 may include, for example, a first value 134 associated with a high value 135 for the financial instrument 112 during the time interval 122 and a second value 134 associated with a low value 136 for the financial instrument 112 during the time interval 122. If desired, the values 134 may further include a third value associated with an opening value 137 for the financial instrument during the time interval and a fourth value associated with a closing value 138 for the financial instrument 112 during the time interval 122.

It will be recognized that this listing of values 134 is not exhaustive, and that any other value within the time interval may be used to determine the presence of the spike, as appropriate. For example, the second or third highest (or fourth highest, and so on) or lowest values, or combinations of these values, as desired, may be used as the high or low, respectively. Moreover, it will be recognized by those of skill in the art that any suitable mathematical operation may be performed on the illustrated or other values 134 as desired.

Figure 2A:
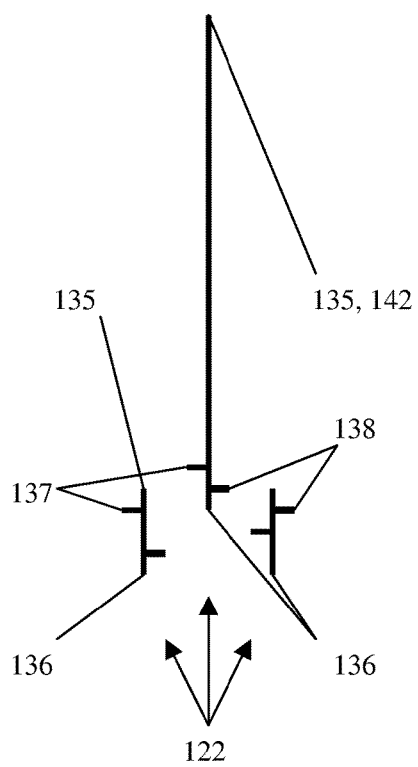
Figure 2B:
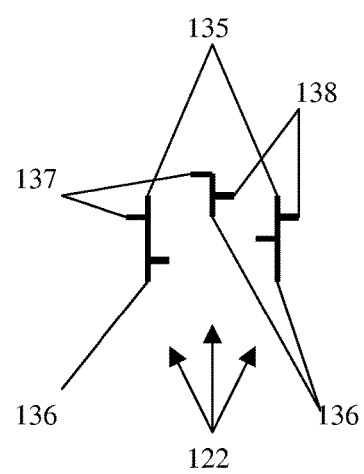

For purposes of illustration, and not limitation, FIG. 2(A) and FIG. 2(B) illustrate three consecutive time intervals 122. Each time interval includes an opening value 137, a high value 135, a low value 136 and a closing value 138. As will be appreciated, each interval 122 may be of any length of time, as desired. Typically, in financial applications, charts such as intraday charts for a particular financial instrument (e.g., security) will include many time intervals that are several minutes in length each. As will be appreciated, each time interval 122 may likely include information relating to many individual transactions (e.g., trades) involving the financial instrument of interest.

With continuing reference to FIG. 1, as further illustrated in step 140, the presence of an anomaly such as a spike 142 may be detected in the first set of data 132 by way of an analysis, described in further detail below. For purposes of illustration only, FIG. 2(A) illustrates the presence of a spike 142 in the second depicted time interval 122, wherein the spike 142 is represented by the high value 135. Similarly, FIG. 3(B) depicts a spike 142 that has a value that is the same as the high value 135 as well as the opening value 137. By way of contrast, the second time interval depicted in FIG. 3(A) shows a jump in price, as opposed to a spike.

The analysis to detect the spike or other anomaly may be carried out in a variety of ways. Preferably, reference is made to values in other time intervals to evaluate the likelihood of the presence of a spike in the interval of interest.

For example, the values associated with a first sub interval within the time interval may be analyzed to determine the presence of a spike therein. Preferably, the first sub interval is analyzed to determine the presence of a spike therein with reference to values associated with a second sub interval within the time interval.

For purposes of illustration and not limitation, with reference to FIG. 2(A), the center depicted interval 122 may be considered to be a first sub interval. The values present in this first sub interval may be compared with values in a second sub interval, such as the interval present at left in FIG. 2(A). The first sub interval may occur at substantially the same time as the analysis (i.e., be a current sub interval) or may actually be a past sub-interval. Similarly, the sub intervals may be of the same or different amounts of time, as desired.

This comparison may be carried out in a number of ways. For example, a first quantity may be computed from values associated with the first sub interval. A second quantity may be computed using values (preferably analogous values)

associated with the second sub interval. For example, such a quantity relating to an upward, or "positive" spike may be computed by (i) subtracting the opening value 137 from the high value 135 (i.e., High-Open or "H-O") and/or (ii) subtracting the closing value 138 from the high value 135 (i.e., High-Close or "H-C"). Similarly, such a quantity relating to a downward, or "negative" spike may be computed by (i) subtracting the low value 136 from the opening value 137 (i.e., Open-Low or "O-L") and/or (ii) subtracting the low value 136 from the closing value 138 (i.e., Close-Low or "C-L").

Whatever quantity is used, the first sub interval may be determined to include a spike if the magnitude of the first quantity is substantially greater than the magnitude of the second quantity. For example, the H-O quantity may be computed for the first and second sub intervals illustrated in FIG. 2(A). It will be recognized that the use herein of the term "sub interval" is used to help distinguish values in a time interval relating to a first time period (or periods) from values in a different time interval relating to a second time period (or periods). As will be appreciated, a sub interval may take many forms including, for example, a single contiguous time interval, a set of contiguous time intervals (e.g., first, second and third contiguous time intervals), and a set of non-contiguous intervals (e.g., first and fifth time intervals wherein five contiguous time intervals are present).

As depicted in FIG. 2(A), if one were to assume that the relative scale of the depicted intervals were accurate, the H-O value for the center "first" sub interval would be much greater than the H-O value for the "second" sub interval at left. The same would hold true for the H-C values for each of the depicted intervals. The difference in magnitude may be such that the quantity/quantities relating to the first sub interval may be a number of times larger than for that relating to the second sub interval.

In accordance with one embodiment, the presence of a spike in the sub interval of interest may be indicated if the first quantity is more than two or three times the magnitude of the second quantity. However, depending on the volatility of the particular financial instrument, a spike may not be evident unless the magnitude first quantity is significantly greater than that of the second quantity (such as five, seven, or nine times greater (the latter being roughly equivalent to three standard deviations)) or even larger, as appropriate.

As will be further appreciated, in certain circumstances it may be desirable to use a plurality of quantities calculated from the values of the various intervals. For example, as will be appreciated, the presence of spike 142 may be readily detected in the example of FIG. 2(A) by simply relying on the quantity of High-Open (H-O) or High-Close (H-C). However, the scenario presented in FIG. 3(A) requires that two quantities be considered to determine whether a spike is present. Specifically, comparison of only the relative values of H-O for the sub intervals at left and at center would seem to suggest that a spike is present. However, comparison of the relative H-C values indicates not much of a variation. Indeed, this reveals that the change in value of the financial instrument depicted in these intervals actually appears to have risen.

By way of further example, FIG. 3(B) depicts three consecutive sub intervals. However, the first depicted sub interval may have occurred at the close of trading one day, and the second interval may represent the open of the subsequent trading day. In this situation, the quantity of H-O for the sub interval at left is actually infinitely larger than that for the center interval, wherein the value of H-O is zero. In this case, where H-O is zero for the interval of interest is zero, the presence of spike 142 may be detected by comparing the quantity H-C, which clearly demonstrates the presence of spike 142.

By way of still further example, if the opening value for a sub interval is the same as the high value, the closing value of the immediately preceding sub interval may be used in place of the opening value of the sub-interval of interest. Referring again to FIG. 3(B), this would result in a H-O quantity for the first two sub intervals that would reveal the presence of spike 142. An analogous substitution may similarly be applied when the Low=Open, which would accordingly reveal the presence of a negatively directed spike.

It will be further appreciated that it may also be necessary to refer to a subsequent sub interval to determine the presence of a spike in an earlier interval. For example, if H-C for a given interval were zero, it would be advantageous to determine if a spike or a jump were present with reference to subsequent events. Accordingly, it would be possible substitute the opening value of the subsequent sub interval for the closing value of the sub interval of interest. This accordingly will reveal the presence of a spike, if one is present. An analogous substitution and analysis may be used in a situation where the closing value of the given interval is the same as the low value for the given interval. Moreover, in accordance with another embodiment, corresponding quantities between a given sub interval and a subsequent sub interval may be compared to detect the presence of a spike in the given sub interval.

In accordance with a further aspect of the invention, the second sub interval may include a plurality of further sub intervals.

For purposes of illustration and not limitation, as embodied herein, while the presence of a spike may be detected with reference to comparative values in a single previous sub-interval, such a comparison may be made between a quantity computed for the sub interval of interest, and an average value for a plurality of previous sub intervals. For example, the High-Open and/or High-Close value may be computed for the previous ten or twenty (or any other suitable number) of preceding sub intervals, and averaged. This average quantity may then be compared with the corresponding quantity for the sub interval under examination. Such averaging may help improve the accuracy of spike detection by accounting for the volatility in the data. As will be appreciated, a number of contiguous sub intervals may be averaged and/or a number of non-contiguous sub intervals may be averaged.

A plurality of sub-intervals may accordingly be referenced on a rolling basis, such as in a software implementation of the method. At any given time during operation, a particular sub interval (e.g., a "current" sub interval) will have just been completed. Information relating to the preceding plurality of sub-intervals can then be used to compute a running average that is used to compare to the interval of interest. The plurality of preceding sub intervals may comprise a selectable or fixed predetermined number of sub intervals. For example, whenever a given sub interval 122 is being analyzed, a running average H-O quantity may be continuously computed of the preceding 10, 20, 50, 100, or however many preceding sub intervals as desired.

In accordance with a further aspect of the invention, the method may further include determining that the time interval includes the spike, and transmitting a signal representative of a graphical representation of a set of transactions associated with the financial instrument.

Figure 4A:
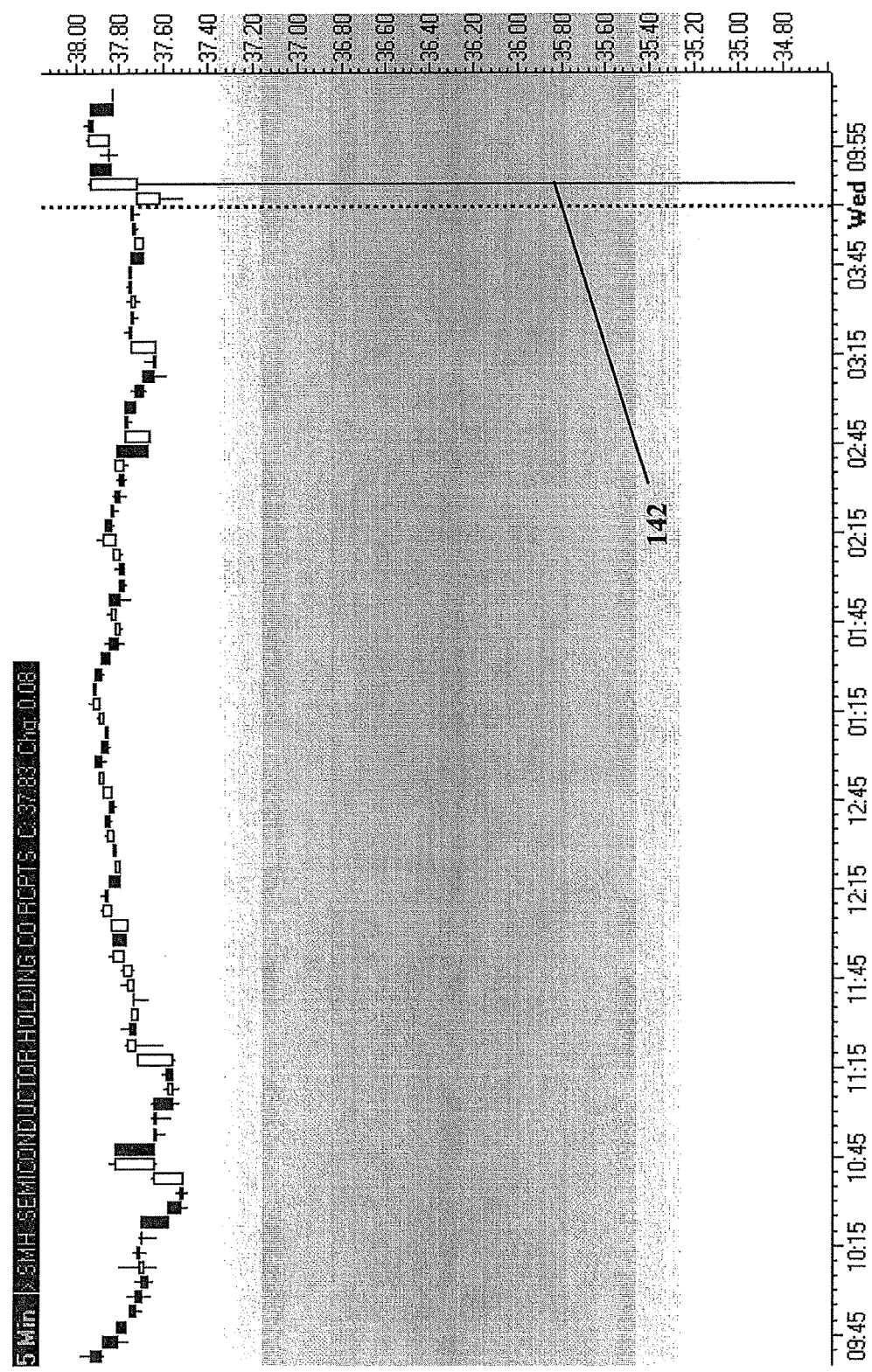
FIGS. 4(A)-4(B) are graphical representations of financial data wherein a data spike (FIG. 4(A)) is present and after the data spike is removed (FIG. 4(B)) using techniques provided in accordance with the present invention.

When a spike comes through on either a high or a low it causes the chart to rescale, and, depending on the size of the spike, it can render the chart practically useless from a graphical perspective. For purposes of illustration and not limitation, FIG. 4(A) depicts an intraday chart for Semiconductor Holders Trust (SMH). As is evident, a negative 10% spike 142 skews the chart and compresses the remaining data, losing much of the information showing trends in price that would otherwise be visible. As will be appreciated, whether spike 142 arises from erroneous information or otherwise is not especially important. What is significant is that the graphical representation of the chart is simply not useful.

Accordingly, the method of the invention may provide for removal of the spike from the data or otherwise eliminating the effect of the spike on displaying the data.

Figure 4B:
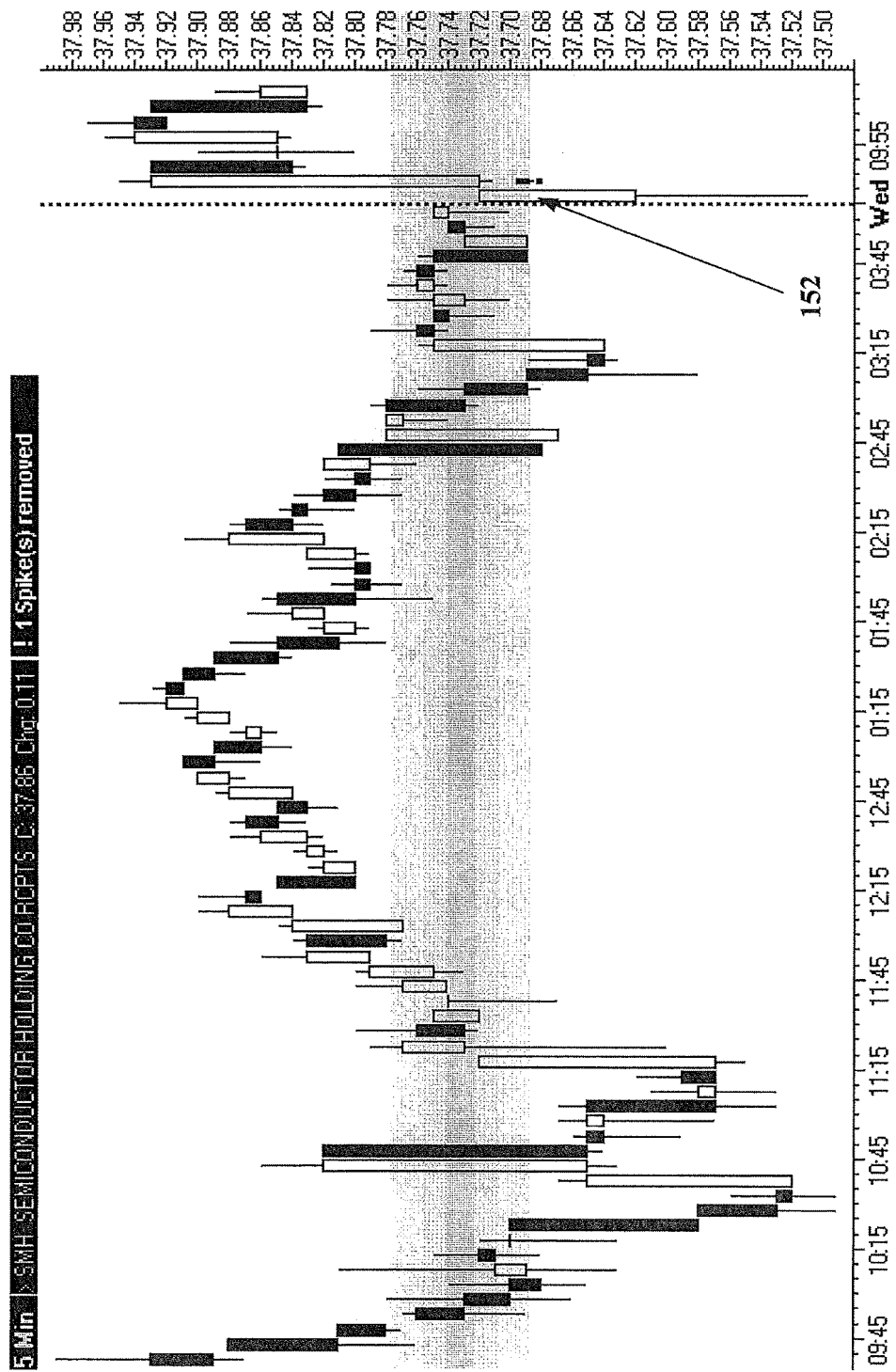

With continuing reference to FIG. 1, the spike 142 may be removed from the data or otherwise rendered ineffective so that it does not distort the graphical representation of the data in step 150. FIG. 4(B) illustrates the same graphical information depicted in FIG. 4(A) after spike 142 has been removed from the chart. However, the depicted graphical representation is superior because the chart has been rescaled due to removal of the spike. Accordingly, additional detail in the data is present that was not detectable earlier to the casual observer. Accordingly, the graphical representation of data in FIG. 4(B) is accordingly adapted and configured to prevent the spike 142 from substantially affecting the scale at which information relating to the set of transactions is displayed.

If desired, at step 150 or elsewhere, the method may further include applying graphical indicia 152 to the graphical representation to indicate the location of the spike in the time interval. For purposes of illustration and not limitation, as depicted in FIG. 4(B), graphical indicia 152 may be applied to the chart to indicate the location of the removed spike 142. The indicia may take any desired representation.

The value associated with the spike 142 may simply be deleted. If desired, the value associated with the spike 142 may be replaced with the closing value associated with the time interval or the opening value associated with the time interval, as desired.

As will be appreciated, a user may be given the choice to control the impact of the spike 142 on the graphical representation. For example, the user may be able to specify an amount by which the first quantity (e.g., the H-O value for the desired sub interval) exceeds the second quantity (e.g., the H-O value for the "reference" sub interval(s)) before the presence of a spike is detected in the sub interval.

As will be appreciated, the time interval of interest (or any sub interval thereof) may actually include a plurality of positive and/or negative spikes. This is illustrated in detail below in the disclosed Example.

EXAMPLE I

One example of a significant price spike that rendered an intra day chart useless from a practical standpoint occurred with respect to shares for Home Depot, Inc. (symbol "HD") on the open of trading on Wednesday, Sep. 5, 2007. The back end systems in place of the Assignee of the present invention were not capable of rectifying this type of spike. Among other things, this "spike" was actually a series of spikes that were based on multiple trades. Each of these trades must meet regulatory rules for 'setting last price.' Since an embodiment of a software program provided in accordance with the invention is under user control, and not subject to regulatory rules, it can remove such outlying data.

In the particular example, the spikes may have resulted from unknown market participants attempting to skew or sway prices one way or the next via a series or sequence of trades that may have been generated programmatically. This may actually be an example of what is generally known as "tape painting," or "stop running." Both are amongst a variety of phenomena typically associated with attempts to manipulate a security or market, and the broad, artificially generated price swings can wreak havoc on charts.

Figure 5A:
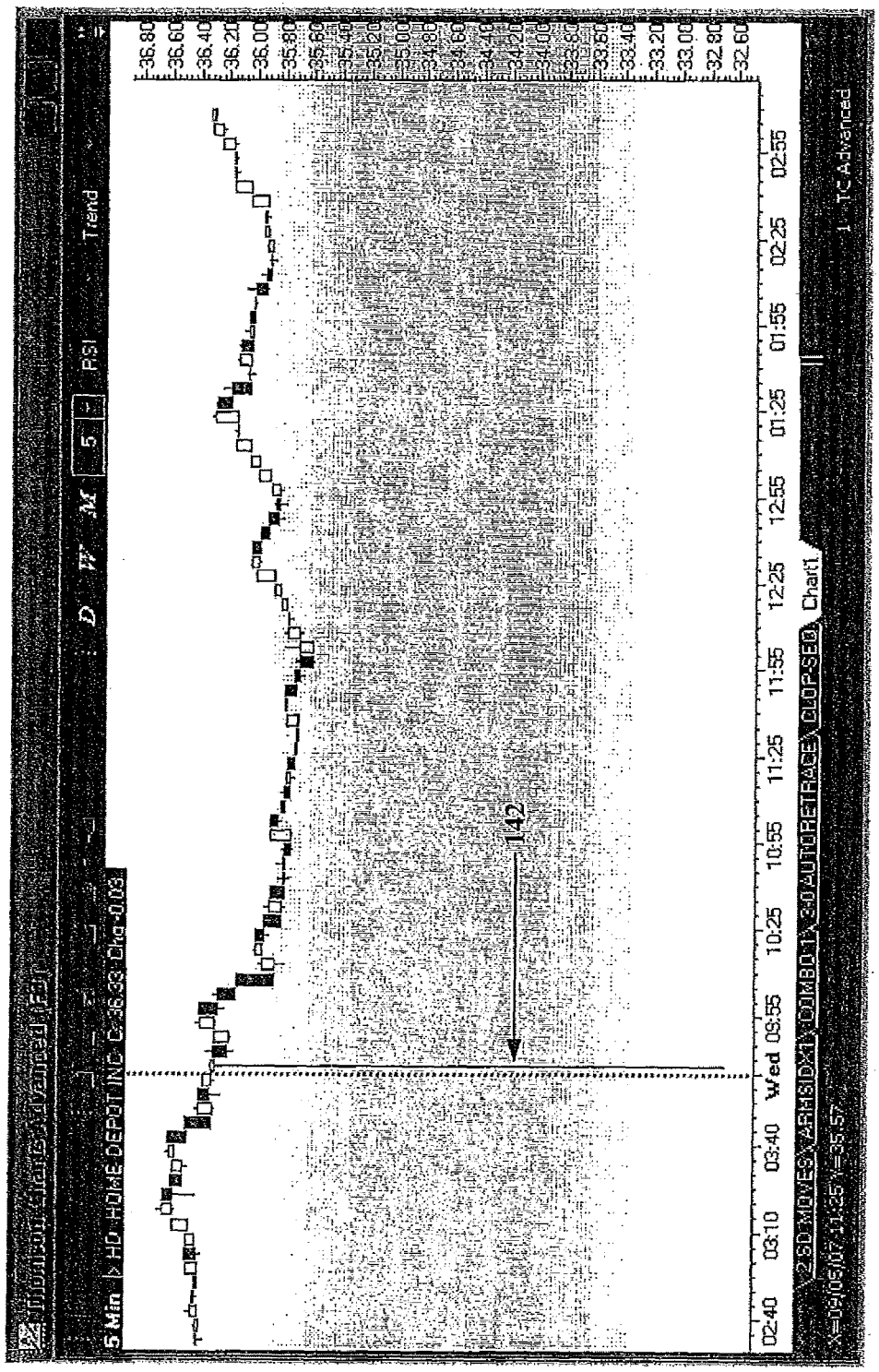
FIGS. 5(A)-5(B) are further graphical representations of financial data wherein a data spike (FIG. 5(A)) is present and after the data spike is removed (FIG. 5(B)) using techniques provided in accordance with the present invention.

An intraday chart depicting this anomaly is presented in FIG. 5(A). To the casual observer, FIG. 5(A) implies that this spike may merely be an outlying value that may be erroneous.

Figure 5B:
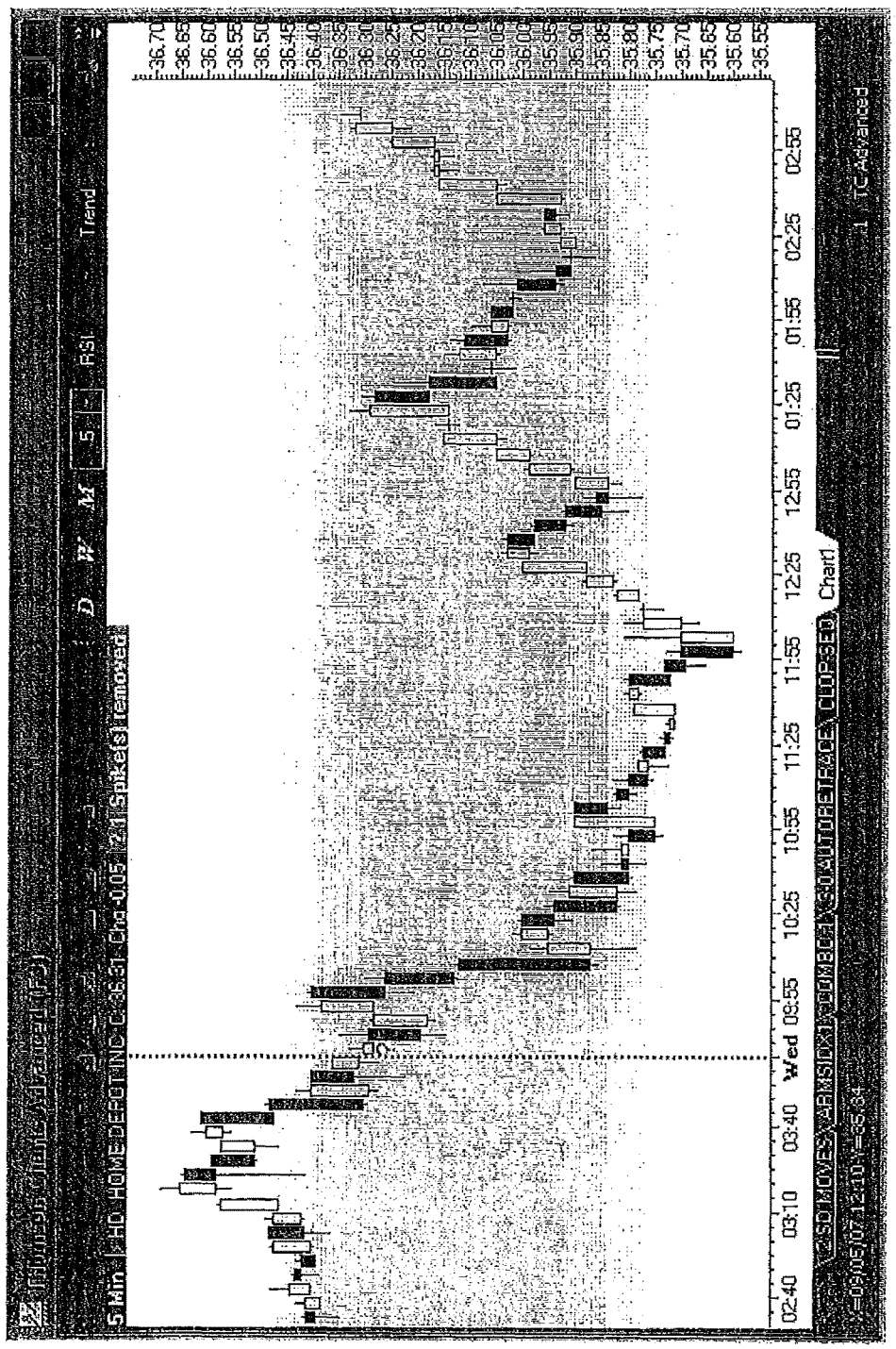

However, the spike is actually made up from values ("low" values) arising from nearly 250 trades involving nearly 76500 shares of stock and 170 quote changes that occurred within about eight seconds that momentarily caused the price of Home Depot stock to drop nearly 10%. An expanded view of this eight second period is presented in FIG. 6. Accordingly, this eight second sub-interval is actually comprised of a large number of data points. FIG. 5(B) presents a revised chart after a routine is actuated to eliminate the eight second spike. What is significant is that this embodiment of the invention was effective in removing this anomaly from the data.

The invention also provides a system, machine readable program and associated graphical user interface for analyzing financial data. The system may include means for implementing some or all of the method steps described herein. The program contains instructions for implementing some or all of the method steps described herein. The program may be adapted and configured to implement the system of the invention. The graphical user interface of the invention may include a plurality of fields for implementing the method of the invention.

An exemplary implementation of the system of the invention is described below, illustrating various features of an exemplary machine readable program and graphical user interface.

EXAMPLE II

Software Implementation

In accordance with one embodiment of the invention, a software program was implemented to carry out removal of spikes from data. A software program embodying the advantages herein is preferably implemented as a feature in a larger software program or suite relating, for example, to financial data. By way of further example, such a program may also be implemented as a stand-alone application that processes inputted data.

In accordance with one implementation, an application for removing data spikes is available as a technical indicator from the Main Menu in Thomson Charts Advanced on the THOMSON ONE™ platform.

Figure 7A:
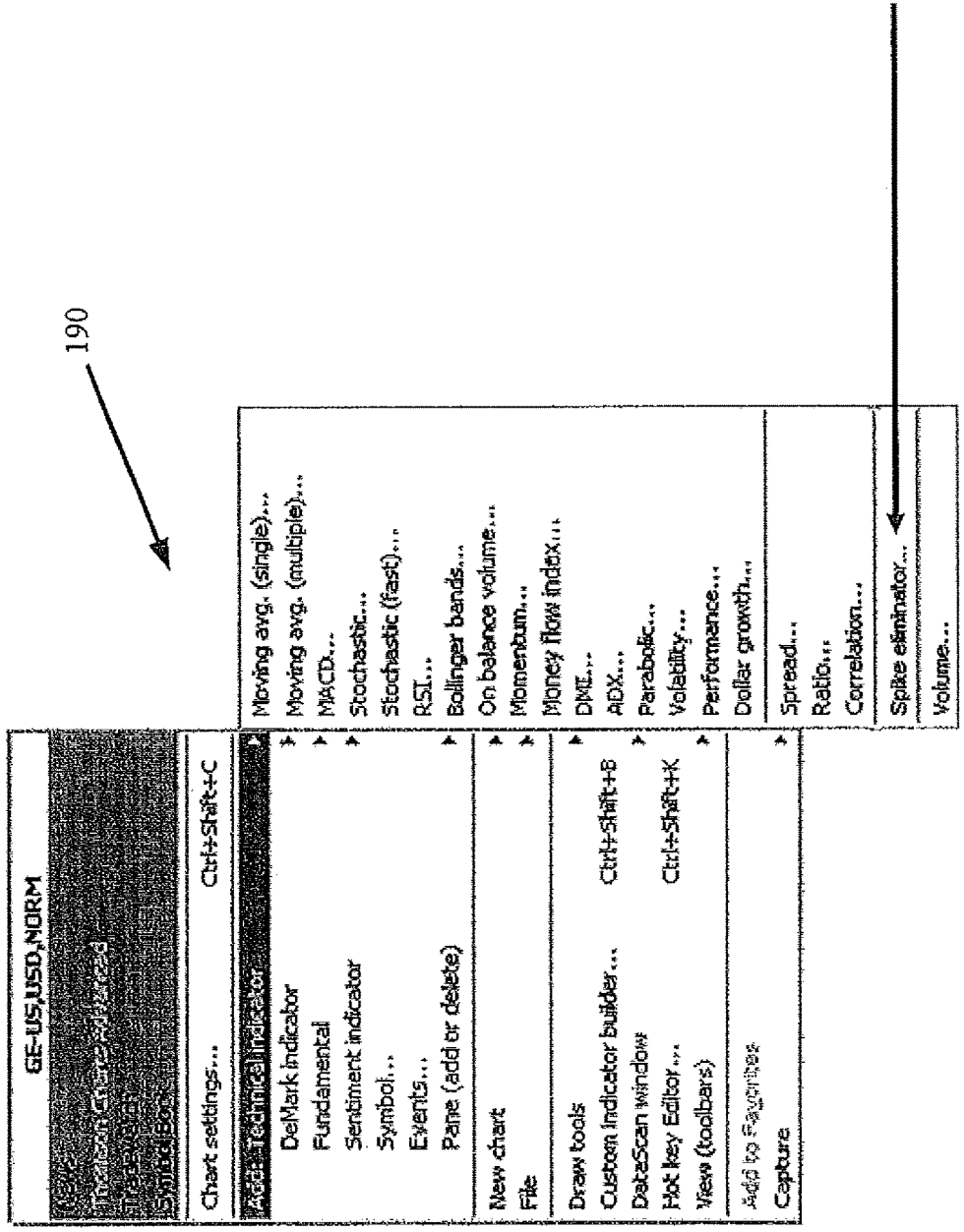
FIGS. 7(A)-7(B) and 8(A)-8(B) are depictions of graphical user interfaces that may be utilized to operate a machine readable program and/or system provided in accordance with the invention.
Figure 7B:
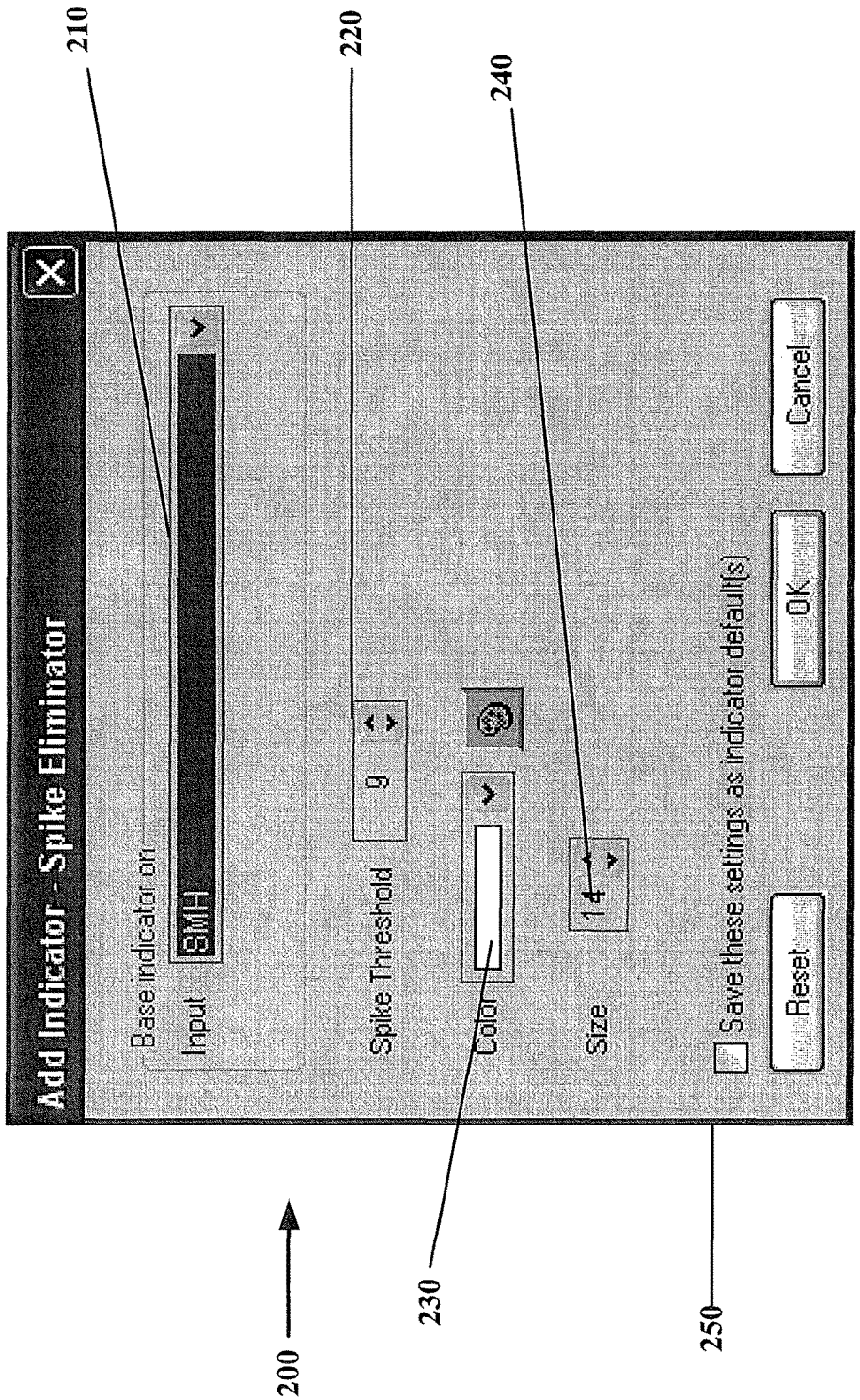

The program may be accessed through a menu structure, for example, by "right clicking" on the screen and selecting "Add: Technical indicator>Spike eliminator" from the menu 190 as depicted in FIG. 7(A), which displays an "Add Indicator" dialog window 200 as depicted in FIG. 7(B). A dropdown menu 210 is provided for selecting an input to base the indicator on for when there is more than one symbol on the chart. There is also a spinner 220 for selecting the detection sensitivity of the program, with each whole number increment representing an order of magnitude of the average quantity being measured (e.g., High-Open; High- Close, etc.). For example, a detection sensitivity of 9 is depicted (about three times the standard deviation) for comparing the value of the time sub interval of interest with one or more reference sub intervals. A further dropdown menu 230 to select colors along with a palette control for more color choices is also provided. A spinner 240 is provided to select the font size, and a check box 250 is provided to 'save as default.'

Figure 8A:
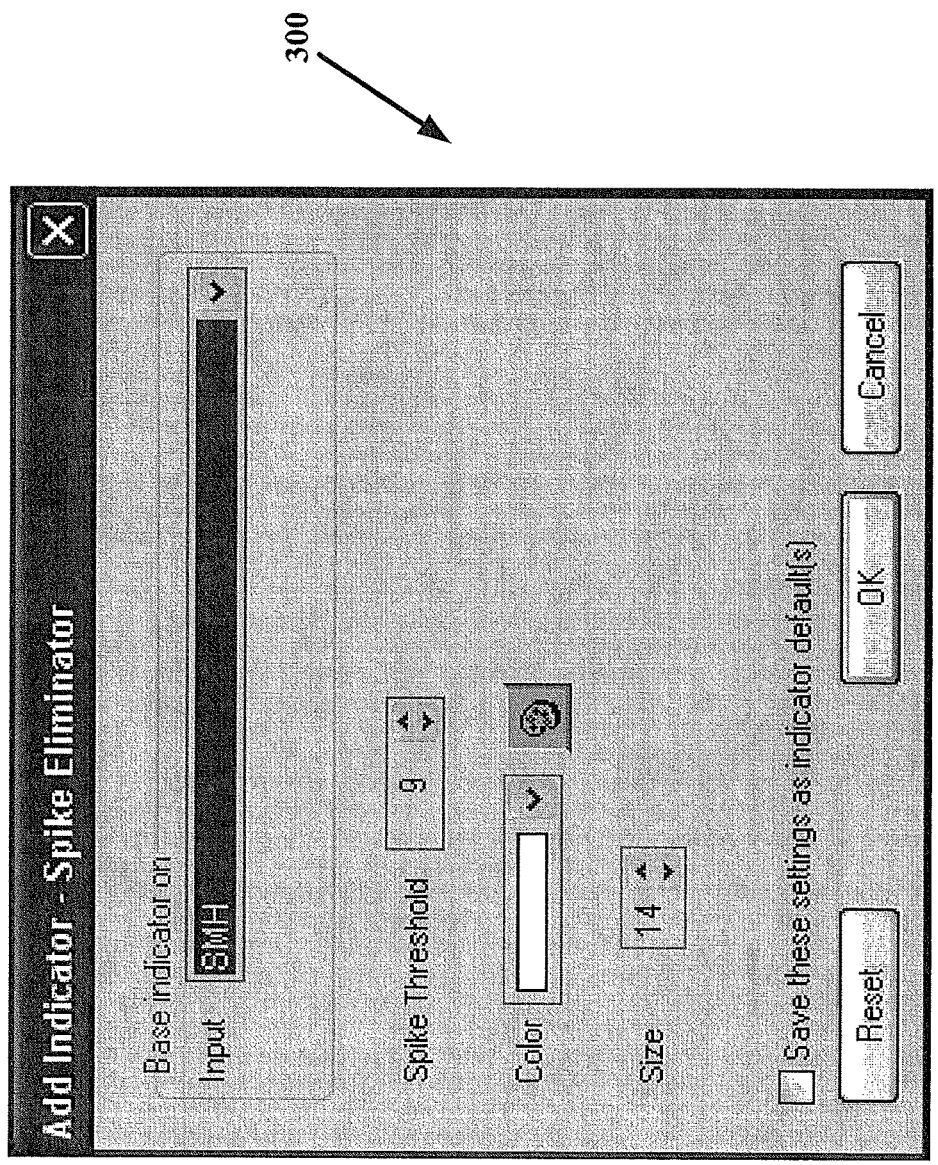
Figure 8B:
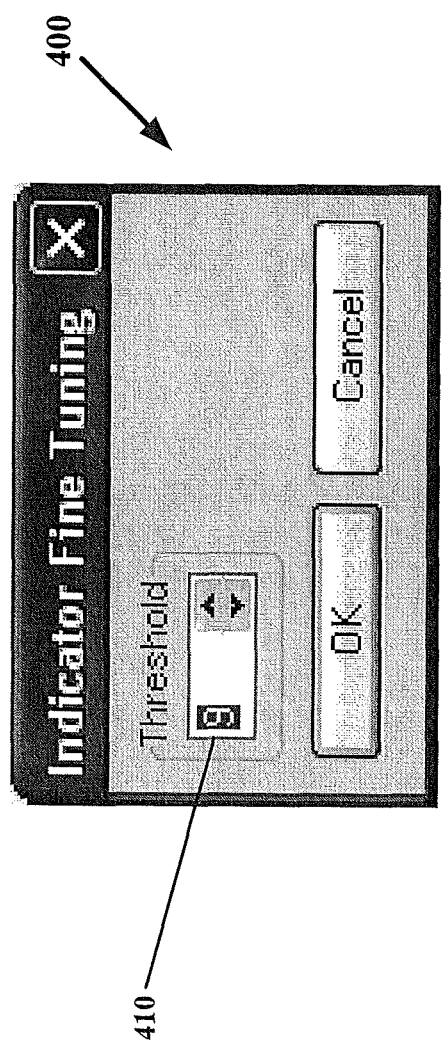

As indicated in FIG. 8(A), an "Indicator settings" dialog 300 is also provided, and may be accessed by right clicking or double clicking on the screen. In accordance with one embodiment, the "Add indicator" dialog 200 depicted in FIG. 7(B) is launched when an indicator is initially added to a chart. The "Indicator setting" dialog 300, in contrast, may be used to adjust the settings of an indicator once it is already on the chart. The settings dialog 300 displays the same options as the Add indicator dialog 200. Furthermore, as depicted in FIG. 8(B), a fine tune indicator ("tweaker") dialog 400 is also provided that permits a user to adjust the threshold value and see the impact of his changes in real time, as desired.

Although not required, software programs and systems carried out in accordance with the teachings herein preferably are adapted and configured to measure opening, high, low and closing prices for each interval. Moreover, such programs also preferably measure the quantities of High-Open, High-Close, Open-Low and Close-Low for each interval or sub interval, as desired. If a number of reference sub intervals are measured and averaged, it is preferred that the averages of each of the four aforementioned quantities are computed to permit comparison between reference intervals and the interval(s) of interest on any desired basis. As will be appreciated, embodiments herein may provide for automatic detection and removal of spikes or other anomalies, and/or may provide for selective removal of such spikes or anomalies.

In further accordance with the invention, in addition to comparison of average differences against current differences to detect spikes, it is also possible to measure probability distributions of the differences and then comparing the current differences against the values of confidence level of these distributions. In this case the process of removing spikes has a clear quantitative characteristic showing the degree of confidence that the removed spike is really a spike.

For purposes of illustration and not limitation, as embodied herein, the usual assumption for one variable is that a difference (such as "x"=High-Close) has normal distribution with a mean $m_x$ and a standard deviation $s_x$:

$$f(x)=\exp[-(x-m_x)^2/2s_x]/[\mathrm{sqrt}(2*Pi)* s_x]. \quad (1)$$

The values of $m_x$ and $s_x$ can be estimated from the experimental values $x_i$, where i=0, 1, 2, 3, ... N−1, and N is the number of intervals in the data set:

$$m_x=(x_{N-1}+ \ldots +x_2+x_1+x_0)/N \quad (2)$$

$$s_x=\mathrm{sqrt}\{[(x_{N-1}-m_x)^2+ \ldots +(x_2-m_x)^2+(x_1-m_x)^2+(x_0-m_x)^2]/N\} \quad (3)$$

After $m_x$ and $s_x$ are known, it is possible to conclude with a level of confidence how probable is the fact that the particular value of x is a fluctuation. For example, if $x>m_x+(1.64*s_x)$ it is a fluctuation with confidence of 95%. By way of further example, if $x>m_x+(2.32*s_x)$ it is a fluctuation with confidence 99%.

By way of further example, in the case of two variables (such as "x"=High-Close and "y"=High-Open) the usual assumption may be that these variables are distributed according to the bi-normal law with means $m_x$, $m_y$, standard deviations $s_x$, $s_y$, and correlation r:

$$f(x,y)=\exp[-z/2(1-r^2)]/[2*Pi*s_x*s_y*\mathrm{sqrt}(1-r^2)],$$
where $z=(x-m_x)^2/s_x^2-2r*(x-m_x)*(y-m_y)/(s_x*s_y)+(y-m_y)^2/s_y^2$.

The values of $m_x$, $m_x$, $s_x$, $s_y$ and r can be estimated from the experimental values $x_i$, and $y_i$, where i=0, 1, 2, 3, ... N−1, and N is the number of intervals in each data set:

$$m_x=(x_{N-1}+ \ldots x_2+x_1+x_0)/N \quad (4)$$

$$s_x=\mathrm{sqrt}\{[(x_{N-1}-m_x)^2+ \ldots +(x_2-m_x)^2+(x_1-m_x)^2+(x_0-m_x)^2]/N\} \quad (5)$$

$$m_y=(y_{N-1}+ \ldots +y_2+y_1+y_0)/N \quad (4)$$

$$s_y=\mathrm{sqrt}\{[(y_{N-1}-m_y)^2+ \ldots +(y_2-m_y)^2+(y_1-m_y)^2+(y_0-m_y)^2]/N\} \quad (5)$$

$$r=\mathrm{sqrt}\{[(x_{N-1}-m_x)*(y_{N-1}-m_y)+ \ldots +(x_0-m_x)*(y_0-m_y)]/N\}/[s_x*s_y] \quad (6)$$

After $m_x$, $m_x$, $s_x$, $s_y$ and r are known, it is possible to conclude with a level of confidence C that if both x and y are greater than some threshold R then it is a spike:

$$C = \left[1 - \int_R^\infty dx \int_R^\infty f(x,y) dy\right] * 100\%.$$

Even more precise results may be achieved by using econometric modeling during the process of building probability distributions. This kind of modeling allows extracting parameters of the distribution with better accuracy.

By way of example, the prices of financial instruments in a diffusion price model are distributed log-normally, not normally. A jump-diffusion price model distribution has even more complex law (see for example S. G. Kou, "A Jump-Diffusion Model for Option Pricing", Management Science, Vol. 48, No. 8, Aug. 2002). This article and all other publications referenced herein are incorporated by reference in their entireties.

As will be appreciated by those of skill in the art, embodiments of the invention may be applied to real-time, dynamic charts as well as static charts. Specifically, when new trades are transmitted by the exchanges, real time charts generally update graphically as this information is received (either in real time or after a short delay). By way of further example, static charts can be considered to include charts where the displayed graphical data depicts the pricing structure of a financial instrument as of a time that the request for data was made, but wherein the chart does not update automatically as new trades are made and transmitted by the exchanges. As will be further appreciated, either of these types of charts is relevant to both intra day charts and historical charts (e.g., daily/weekly/monthly, etc.). While spikes are certainly problematic for intra day charts, such anomalies can also impact charts covering longer time periods. As such, it will be appreciated that embodiments of the invention are applicable to all such methodologies for collecting and displaying data.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Block diagrams and other representations of circuitry herein represent conceptual views of illustrative circuitry and software embodying the principles of the invention. Thus the functions of the various elements shown in the Figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. The functions of those various elements may be implemented by, for example, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

Similarly, it will be appreciated that the system flows described herein represent various processes which may be substantially represented in computer-readable medium and so executed by a computer or processor, whether or not such computer or processor is explicitly shown. Moreover, the various processes can be understood as representing not only processing and/or other functions but, alternatively, as blocks of program code that carry out such processing or functions.

The methods and systems of the present invention, as described above and shown in the drawings, provide for methods, systems, computer programs and graphical user interfaces that provide superior functionality with respect to those of the prior art. It will be apparent to those skilled in the art that various modifications and variations can be made in the various illustrated embodiments of the present invention without departing from the spirit or scope of the invention. Thus, it is intended that the present invention include modifications and variations that are within the scope of the appended claims and their equivalents.

What is claimed is:

1. A computer-implemented method of adjusting the scale resolution of a displayed set of data values of a chart associated with a financial instrument displayed in a graphical user interface (GUI), the method comprising:
   monitoring the displayed chart to detect a rescale condition, said chart including data points representing variations in the set of data values, wherein detecting the rescale condition includes detecting a spike in the set of data values that causes the chart's scale resolution to decrease such that, due to the decreased scale resolution, the variations in the set of values for the financial instrument are graphically compressed;
   determining that the spike is an anomaly;
   removing the spike from the set of data values based on the spike being an anomaly;
   automatically rescaling the chart with the spike removed such that the scale resolution of the chart is increased: and
   displaying the rescaled chart on the GUI with the increased scale resolution such that the variations in the set of values for the financial instrument are graphically expanded due to the increased scale resolution, wherein the determining that the spike is an anomaly is determined by:
   a) identifying a time interval associated with the financial instrument, the financial instrument having a first set of data related thereto, wherein the first set of data includes a plurality of values selected from the group consisting of:
      (i) a first value associated with a high value for the financial instrument during the time interval,
      (ii) a second value associated with a low value for the financial instrument during the time interval,
      (iii) a third value associated with an opening value for the financial instrument during the time interval, and
      (iv) a fourth value associated with a closing value for the financial instrument during the time interval,
   b) based upon the first set of data, analyzing whether the time interval includes the spike, and based upon a pre-determined confidence C, determining that the time interval includes the spike $$C = \left[1 - \int^{\infty} R\, dx \int^{\infty} R\, f(x, y) dy\right]^* 100\%$$

wherein R is a user selected threshold, x is equal to the high value minus the closing value, and y is equal to the high value minus the opening value.

2. The method of claim 1, further including displaying a graphical indicia to the graphical information to indicate the spike's location in the time interval.

3. The method of claim 1, further comprising deleting the spikes's value.

4. The method of claim 1, further comprising replacing the spike's value with the closing value associated with the time interval or the opening value associated with the time interval.

5. The method of claim 1, wherein the user is able to control the impact of the spike on the rescaled chart and the sensitivity of the analysis is adjusted by the user.

6. The method of claim 1, wherein the pre-determined confidence value C is at least 95%.

7. The method of claim 1, further comprising the steps of:
   calculating a difference based on two of the first, second, third and fourth values; and
   calculating the mean and standard deviation related to the difference to determine C.

8. The method of claim 7, wherein the difference is equal to the first value minus the fourth value.

9. The method of claim 1, wherein values associated with a first sub interval within the time interval are analyzed to determine the presence of the spike therein.

10. The method of claim 9, wherein the presence of the spike is determined with reference to three values associated with the first sub interval and the three values include the opening value, the closing value, and a value selected from the group consisting of (i) the high value, and (ii) the low value.

11. The method of claim 9, wherein the first sub interval includes a plurality of spikes, one of the spikes being a negative spike and one of the spikes being a positive spike.

12. The method of claim 9, wherein the first sub interval occurs at a same time as the analysis.

13. The method of claim 9, wherein the first sub interval is analyzed to determine the presence of the spike therein with reference to values associated with a second sub interval within the time interval and the spike is detected in the first sub interval by comparing a first quantity computed from values associated with the first sub interval with a second quantity computed using values associated with the second sub interval.

14. The method of claim 13, wherein the second sub interval includes a plurality of further sub intervals, and the second quantity is computed by averaging a plurality of sub quantities, each sub-quantity being computed from values associated with each sub interval.

15. The method of claim 14, wherein the first quantity is computed by subtracting an opening or closing value associated with the first sub interval from a high or low value associated with the first sub interval.

16. The method of claim 15, wherein the closing value associated with a sub interval prior to the first sub interval is substituted for the opening value associated with the first sub interval to compute the first quantity if the opening value associated with the first sub interval is equal to either of (i) the high value associated with the first sub interval, or (ii) the low value associated with the first sub interval.

17. The method of claim 15, wherein the opening value associated with a sub interval subsequent to the first sub interval is substituted for the closing value associated with the first sub interval to compute the first quantity if the closing value associated with the first sub interval is equal to either of (i) the high value associated with the first sub interval, or (ii) the low value associated with the first sub interval.

18. The method of claim 15, wherein the time interval is determined to include the spike when the magnitude of the second quantity is three times greater than the magnitude of the first quantity.

19. A computer system that adjusts the scale resolution of a displayed set of data values of rescale a chart associated with a financial instrument for display comprising:
  a hardware processor that executes one or more processes;
  a graphical user interface (GUI) operatively connected to the hardware processor; and a computer readable non-transitory memory operatively connected to the hardware processor and storing a process, the process, when executed by the hardware processor, causes the hardware processor to:
    monitor the displayed chart to detect a rescale condition, said chart including data points representing variations in the set of data values, wherein detecting the rescale condition includes detecting a spike in the set of data values that causes the chart's scale resolution to decrease such that, due to the decreased scale resolution, the variations in the set of values for the financial instrument are graphically compressed;
    determine that the spike is an anomaly;
    remove the spike from the set of data values:
    automatically rescale the chart with the spike removed such that the scale resolution of the chart is increased: and
    display the rescaled chart on the GUI with the increased scale resolution such that the variations in the set of values for the financial instrument are graphically expanded due to the increased scale resolution, wherein the hardware processor performs the following steps to determine that the spike is an anomaly:
      a) identify a time interval associated with the financial instrument, the financial instrument having a first set of data associated therewith including a plurality of values selected from the group consisting of:
        (i) a first value associated with a high value for the financial instrument during the time interval,
        (ii) a second value associated with a low value for the financial instrument during the time interval,
      (iii) a third value associated with an opening value for the financial instrument during the time interval,
      (iv) a fourth value associated with a closing value for the financial instrument during the time interval, and
      (v) the plurality data points for the financial instrument corresponding to a reading every time interval from the opening value to the closing value,
      b) analyze whether the time interval includes the spike using a confidence value "C" based upon a pre-determined confidence C, determining that the time interval includes the spike $$C = \left[ 1 - \int^\infty R\, dx \int^\infty R\, f(x, y) dy \right]^* 100\%$$

wherein R is a user selected threshold, x is equal to the high value minus the closing value, and y is equal to the high value minus the opening value.

20. A machine readable program on a non-transitory computer readable medium containing computer program instructions for adjusting the scale resolution of a displayed set of data values of a chart associated with a financial instrument displayed in a graphical user interface, the program, when executed by a hardware processor, causes the hardware processor to:
  monitor the displayed chart to detect a rescale condition, said chart including data points representing variations in the set of data values, wherein detecting the rescale condition includes detecting a spike in the set of data values that causes the chart's scale resolution to decrease such that, due to the decreased scale resolution, the variations in the set of values for the financial instrument are graphically compressed;
  determine that the spike is an anomaly;
  remove the spike from the set of data values:
  automatically rescale the chart with the spike removed such that the scale resolution of the chart is increased; and
  display the rescaled chart on the graphical user interface with the increased scale resolution such that the variations in the set of values for the financial instrument are graphically expanded due to the increased scale resolution, wherein the instructions further cause the hardware processor to perform the following steps when determining that the spike is an anomaly:
    a) identify a time interval associated with the financial instrument, the financial instrument having a first set of data associated therewith including a plurality of values selected from the group consisting of:
      (i) a first value associated with a high value for the financial instrument during the time interval,
      (ii) a second value associated with a low value for the financial instrument during the time interval, (iii) a third value associated with an opening value for the financial instrument during the time interval, (iv) a fourth value associated with a closing value for the financial instrument during the time interval, and b) analyze whether the time interval includes the spike using a confidence value "C" based upon a pre-determined confidence C, determining that the time interval includes the spike $$C = \left[1 - \int^{\infty} R\, dx \int^{\infty} R\, f(x,y)dy\right]^{*} 100\%$$

wherein R is a user selected threshold, x is equal to the high value minus the closinq value, and y is equal to the hiqh value minus the opening value.

21. A computer-implemented method for analyzing financial data generated in an exchange, wherein the exchange is in communication with a network, the network including a client computer having a hardware processor, computer readable non-transitory memory operatively connected to the hardware processor and storing a program, and a graphical user display (GUI) operatively connected to the hardware processor, wherein the program, when executed by the hardware processor, causes the hardware processor to perform the method comprising the steps of: of adjusting the scale resolution of a displayed set of data values of a chart associated with a financial instrument displayed in a graphical user interface, the method comprising:

monitor the displayed chart to detect a rescale condition, said chart including data points representing variations in the set of data values, wherein detecting the rescale condition includes detecting a spike in the set of data values that causes the chart's scale resolution to decrease such that, due to the decreased scale resolution, the variations in the set of values for the financial instrument are graphically compressed;

determining that the spike is an anomaly; removing the spike from the set of data values;

automatically rescaling the chart with the spike removed such that the scale resolution of the chart is increased: and displaying the rescaled chart on the graphical user interface with the increased scale resolution such that the variations in the set of values for the financial instrument are graphically expanded due to the increased scale resolution, wherein the determining that the spike is an anomaly is determined by:

a) receiving a first set of data related to the financial instrument on the exchange, the first set of data being within a time interval and including: (i) a high value for the financial instrument during the time interval; (ii) a low value for the financial instrument during the time interval; (iii) an opening value for the financial instrument during the time interval; and (iv) a closing value for the financial instrument during the time interval, b) detecting a spike in the time interval using a confidence value based upon the first set of data, and c) removing the spike from the first set of data based upon a pre-determined confidence C, determining that the time interval includes the spike $$C = \left[1 - \int^{\infty} R\, dx \int^{\infty} R\, f(x,y)dy\right]^{*} 100\%$$

wherein R is a user selected threshold, x is equal to the high value minus the closing value, and y is equal to the high value minus the opening value.

\* \* \* \* \*

UNITED STATES PATENT AND TRADEMARK OFFICE
CERTIFICATE OF CORRECTION

PATENT NO. : 10,504,175 B2
APPLICATION NO. : 11/937737
DATED : December 10, 2019
INVENTOR(S) : Victor Gorelik et al.

It is certified that error appears in the above-identified patent and that said Letters Patent is hereby corrected as shown below:

In the Claims

At Column 14, Claim number 1, Line number 2, delete "the chart is increased:" and replace with --the chart is increased;--.

At Column 14, Claim number 1, Line number 30, delete " $C = [1- {}^\infty\!\int_R dx\, {}^\infty\!\int_R f(x,y)dy]* 100\%$ " and replace with -- $C = [1 - \int_R^\infty dx \int_R^\infty f(x,y)dy] * 100\%$ --.

At Column 15, Claim number 19, Line number 43, delete "set of data values of rescale a chart" and replace with --set of data values of a chart--.

At Column 15, Claim number 19, Line number 61, delete "set of data values:" and replace with --set of data values;--.

At Column 15, Claim number 19, Line number 63, delete "the chart is increased:" and replace with --the chart is increased;--.

At Column 16, Claim number 19, Line number 26, delete " $C = [1- {}^\infty\!\int_R dx\, {}^\infty\!\int_R f(x,y)dy]* 100\%$ " and replace with -- $C = [1 - \int_R^\infty dx \int_R^\infty f(x,y)dy] * 100\%$ --.

At Column 16, Claim number 20, Line number 49, delete "set of data values:" and replace with --set of data values;--.

At Column 17, Claim number 20, Line number 14, delete " $C = [1- {}^\infty\!\int_R dx\, {}^\infty\!\int_R f(x,y)dy]* 100\%$ " and replace with -- $C = [1 - \int_R^\infty dx \int_R^\infty f(x,y)dy] * 100\%$ --.

At Column 17, Claim number 20, Line number 18, delete "closinq" and replace with --closing--.

At Column 17, Claim number 20, Line number 19, delete "hiqh" and replace with --high--.

Signed and Sealed this
Twenty-first Day of January, 2020

Andrei Iancu
*Director of the United States Patent and Trademark Office*

CERTIFICATE OF CORRECTION (continued)
U.S. Pat. No. 10,504,175 B2

At Column 18, Claim number 21, Line number 7, delete "the chart is increased:" and replace with --the chart is increased;--.

At Column 18, Claim number 21, Line number 31, delete " $C = [1- {}^{\infty}\!\int_R dx \, {}^{\infty}\!\int_R f(x,y) dy] * 100\%$ " and replace with -- $C = [1 - \int_R^{\infty} dx \int_R^{\infty} f(x,y) dy] * 100\%$ --.